Oct. 30, 1956  D. N. OBENSHAIN  2,769,072
TEMPERATURE COMPENSATED REFERENCE CELL FOR MEASURING
ELECTRICAL CONDUCTIVITY OF LIQUIDS
Original Filed March 26, 1952
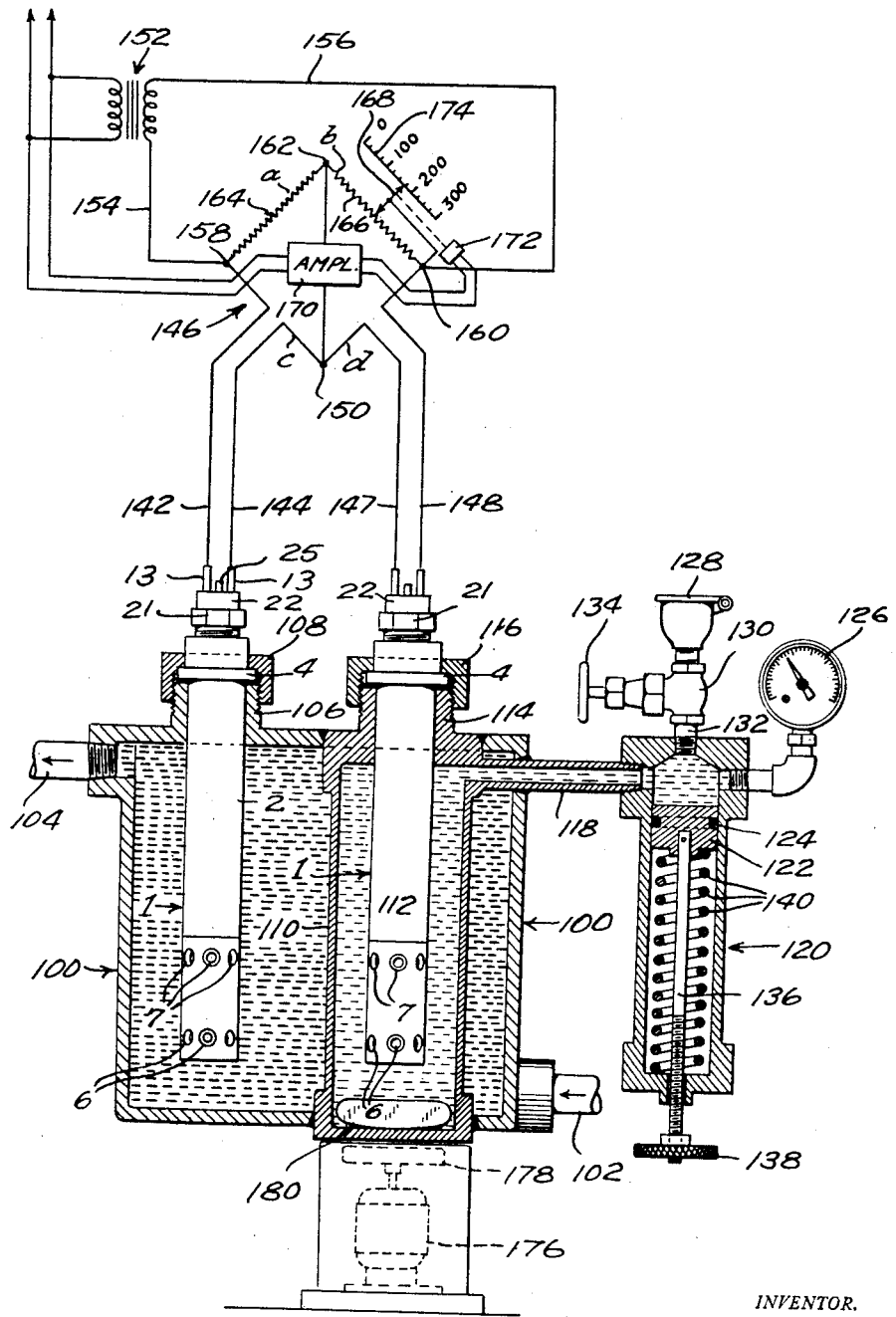
INVENTOR.
DAVID NOEL OBENSHAIN
BY
ATTORNEYS United States Patent Office 2,769,072
Patented Oct. 30, 1956

2,769,072

TEMPERATURE COMPENSATED REFERENCE CELL FOR MEASURING ELECTRICAL CONDUCTIVITY OF LIQUIDS

David Noel Obenshain, Piedmont, W. Va., assignor to West Virginia Pulp and Paper Company, New York, N. Y., a corporation of Delaware Original application March 26, 1952, Serial No. 278,661. Divided and this application October 1, 1953, Serial No. 383,573

6 Claims. (Cl. 201—57)

This invention relates to means for measuring the conductivity of liquids, the present application being a division of my application Serial No. 278,661, filed March 26, 1952.

The invention has been devised primarily for the determination of the concentration of solutions used in chemical processes and subject to depletion, for example, the cooking of wood chips in paper making. In certain cooking processes it is important that the cooking liquor be maintained at a substantially uniform concentration in order that a uniform pulp may be produced.

In accordance with the present invention, advantage is taken of the fact that the electrical conductivity of a solution is a function of its concentration. If other variables can be eliminated or compensated, the concentration of a solution may be determined by measuring its conductivity.

As broadly stated above, the proposal to utilize conductivity measurement for the maintenance of a desired concentration of solution is not new. In the only prior attempt along this line with which I am familiar, however, conductivity cells were utilized which were crude and unsatisfactory and a method of temperature compensation was employed which was inadequate. A chief problem to which the present invention is addressed is to make the indication of the conductivity cell exclusively a function of conductivity.

Change of temperature has a greater effect upon the conductivity of a solution than does change of concentration. The conductivity of a solution is a measure of its ability to conduct electrons, and in the case of sulfate cooking liquor is dependent upon the number and mobility of the Na+, OH−, and SH− ions in the liquor. Little ions such as OH− move fast. Big ions such as Na+ and SH− do not move as fast as the OH− ions. In addition, these big ions carry shells of water molecules which increase their size and lower their mobility. This phenomenon is known as solvation. The degree of solvation is a function of the temperature and decreases as temperature increases, with a consequent increase in the mobility of the ions. The viscosity of water also decreases as the temperature increases. As a result, there is approximately a two percent increase in conductivity for each degree centigrade increase in temperature.

It is a primary object of the present invention to provide practical temperature compensation means so that conductivity measurements may be obtained which are a true index of concentration. A practical and advantageous form of temperature compensation has been contrived and is here described and claimed.

In the carrying out of same, the previously known expedient is resorted to of balancing a reference cell containing a solution of known conductivity against a measuring cell containing the solution to be tested. This procedure involves difficulties, the most important of which is the fact that bubbles tend to form at the electrodes of the reference cell due to temperature and/or electrolytic action. These bubbles so affect the electrical characteristics of the reference cell as to render the readings undependable as an index of concentration of the cooking liquor, particularly above 100° C.

It is an important feature of novelty that the erratic behavior of the reference cell has been eliminated by maintaining the reference cell full of liquid and the liquid under a false pressure sufficient to prevent the formation of bubbles altogether, even when the temperature is above the normal boiling point of the reference solution.

Other objects and advantages will hereinafter appear.

In the drawing forming part of this specification the figure is a sectional elevation, largely diagrammatic, of a temperature compensated concentration measuring apparatus in which measuring and reference cells are utilized.

In the drawing disclosure is made of apparatus in which automatic temperature compensation for conductivity measurements is provided through the employment of a reference cell, the conductivity (or resistance) of the two cells being compared through a Wheatstone bridge apparatus.

A casing 100 is provided which is equipped with a lower inlet connection 102 and an upper outlet connection 104. Liquor is continuously supplied to the casing 100 from the digester through the inlet connection 102 and returned to the digester through the outlet connection 104. A conductivity or measuring cell 1 which is desirably in all respects like the conductivity cell of Figs. 1–3 is mounted in the casing with its flange 4 clamped in a leak-proof manner between a threaded boss 106 of the casing and a union coupling 108.

A smaller casing 110 extends vertically through the casing 100, being rigidly secured and sealed to the top and bottom of the casing 100 in any suitable manner, as by welding. The casing 110 does not communicate with the interior of the casing 100, and hence the test or operating liquor does not have access to the interior of the casing 110. A reference cell 112 is mounted in the casing 110, the reference cell being desirably a duplicate of the conductivity or measuring cell 1. The reference cell 112 is secured in the casing 110 in the same manner that the cell 1 is secured in the casing 100, through a threaded boss 114 on the casing and a union coupling 116.

It is the intention that the liquid in the casing shall correspond in conductivity to the test liquor at standard concentration of the latter and that its conductivity shall have the same law of variation with temperature. The employment of black liquor for use in the reference cell would be ideal but for the fact that the black liquor is not stable as a reference solution. A number of solutions have been tried without finding one which is completely satisfactory. A sodium hydroxide solution has been found the best of those tried and is capable of yielding practically useful results.

I have found that the formation and collection of bubbles on the electrodes of the reference cell can be avoided if, and only if, the casing 110 is kept completely full of liquid at all times with this liquid maintained under a false pressure of 15 to 20 p. s. i. above the vapor pressure of the reference solution at the existing temperature.

Provision is accordingly made of mechanism for replenishing the liquid in the reference cell, for applying pressure to it, and for indicating the pressure under which it is maintained. The pressure is desirably set and maintained at 15 to 20 p. s. i. above the vapor pressure of the reference solution at the highest temperature to which it is expected to be subjected in the apparatus.

A tube 118 in communication with the upper end of the casing 110 extends outward through a wall of the casing 100 into communication with a chamber formed by the upper end of a cylinder 120. The cylinder 120 contains a piston or plunger head 122. The piston 122 is desirably provided with one or more sealing rings 124 of a suitable material such as "neoprene." The upper end of the cylinder 120 is in communication with a pressure gauge 126. A filling cup 128 is connected through a valve 130 and a nipple 132 with the interior of the upper end of the cylinder 120. The valve may be manually operated between open and closed positions through a finger wheel 134.

The piston 122 has affixed to it a piston rod 136. The piston rod has its lower end threaded, and passes through the lower end of the cylinder 120. A handwheel 138 is threaded onto the protruding end of the piston rod for retracting the piston when filling with liquid. A compression coil spring 140 surrounds the rod 136. The spring bears at its lower end against the lower end of the cylinder 120 and at its upper end against the lower side of the piston 122, serving at all times to urge the piston in an upward direction.

When it is desired to replenish the liquid in the cylinder and casing, the piston is retracted until the gauge shows that the pressure in the casing is not above atmospheric pressure. Liquid is poured into the filler cup, and the valve 130 is opened. Any flow of liquid from the cup into the cylinder will be indicated by bubbling up of gas through the solution in the filler cup, and/or a fall of level of the liquid in the filler cup. When it is evident that bubbling, if any has occurred, is at an end the valve 130 is closed and the hand wheel 138 is turned to again place the reference solution under spring pressure.

The spring 140 is so designed that increased expansion of liquid inside casing 110 due to temperature compresses the spring and automatically maintains the pressure of the liquid at a value above the boiling point of the liquid at any temperature within range of the apparatus.

The measuring cell 1 is connected through conductors 142 and 144 in arm $c$ of a Wheatstone bridge apparatus 146. The reference cell 112 which is a duplicate of the measuring cell 1 is connected through conductors 147 and 148 in arm $d$ of the Wheatstone bridge apparatus. Arms $c$ and $d$ are joined to one another at point 150.

Alternating current at low voltage is inductively supplied through a transformer 152 to conductors 154 and 156 of the bridge circuit. The conductors 154 and 156 are connected to one another through arms $c$ and $d$, the conductor 154 being connected to arm $c$ at the point 158, and the conductor 156 being connected to the arm $d$ at point 160. The points 158 and 160 are also connected to one another through arms $a$ and $b$ of the bridge. The arms $a$ and $b$ are joined to one another at point 162.

The arm $a$ includes a fixed resistor 164 while the arm $b$ includes a resistor 166 whose effective value may be varied through a sliding contact 168. A bridging connection is made between points 150 and 162 through an amplifier 170. A reversible motor 172 controlled by the output of the amplifier is connected to slider 168 so as to position the slider as may be required.

When the bridge is out of balance, the sliding contact 168 will be moved in the appropriate direction to restore balance. It is well understood, of course, that the bridge will be in balance when $$\frac{Ra}{Rb} = \frac{Rc}{Rd}$$

where $Ra$, $Rb$, $Rc$ and $Rd$ represent, respectively, the resistances of arms $a$, $b$, $c$, and $d$ of the bridge. A scale 174 is desirably provided for cooperation with the movable contact 168, or a pointer carried by it. This scale indicates in percentage the concentration of the digester liquor as compared with standard concentration. The indication is obtained when the sliding contact has been adjusted as required to bring the bridge into balance. When the concentration is indicated as substantially below one hundred percent, concentrated make-up solution may be fed into the digester in a quantity estimated to be the amount required for restoring the test solution to standard strength.

A magnetic stirrer is provided to keep the reference solution mixed up and to aid rapid heat transfer. I have found also that the conductivity decreases slightly with stirring. Thus the stirred-up reference solution is caused more nearly to match in condition the condition of the solution being tested.

The stirrer comprises a motor 176 which rotates a magnet 178 directly beneath and in proximity to the bottom of the casing 110. A magnet 180 rotatively mounted within the bottom of the casing 110 is caused to be driven by the magnet 178. The magnet 180 constitutes the means for agitating the reference solution. The bottom of casing 110 is substantially non-magnetic.

If fluctuations of temperature are slight and occur infrequently, the reference solution will be maintained at all times at substantially the temperature of the solution which circulates through the casing 100. If, however, the temperature fluctuations are frequent or marked, the apparatus of the figure will not work out in a very satisfactory manner because of the temperature lag of the reference solution. For meeting conditions of that kind, resort must be had to a further embodiment of the invention illustrated in Fig. 5 of my parent case.

While certain preferred embodiments of the invention have been illustrated and described in detail, it is to be understood that changes may be made therein and the invention embodied in other structures. It is not therefore the intention to limit the patent to the specific constructions illustrated, but to cover the invention broadly in whatever form its principles may be utilized.

I claim:

1. A temperature compensating reference cell for use in determining the concentration of a solution under test by reference to its conductivity, said reference cell comprising a closed, impervious casing adapted to be kept completely full of a reference liquid as electrolyte, and a pair of electrodes within the casing, and means for automatically maintaining a stable false pressure in the reference cell substantially above the vapor pressure of the reference liquid at the testing temperature to prevent the formation of bubbles as a result of electrolytic action.

2. In combination, a temperature compensating reference cell for use in determining the concentration of a solution by reference to its conductivity adapted to be kept completely full of a refeernce liquid, means for adjusting the pressure of the liquid in the reference cell between a lower value not above atmospheric and an upper value substantially in excess of the vapor pressure of the reference liquid at the test temperature, comprising an expansion chamber in communication with the reference cell which is provided with a movable wall, means for applying a loading pressure to said wall, and means for supplying a reference liquid to fill the cell and chamber when the pressure on the movable wall is withdrawn.

3. A temperature compensating reference cell for use in determining the concentration of a solution in motion by reference to its conductivity comprising a closed casing in which the reference solution is contained, a pair of electrodes in the casing, and means for stirring the reference solution in the casing.

4. In combination, a temperature compensating reference cell for determining the concentration of a solution by reference to its conductivity adapted to be kept completely full of a reference liquid, and means for maintaining a false pressure in the reference cell substantially above the vapor pressure of the reference liquid at the test temperature comprising a cylinder having a chamber in communication with the refeernce cell, a piston adjustable in the cylinder to increase or diminish the volume of the chamber in communication with the reference cell, a piston operating stem threaded through an end of the cylinder, a spring bearing against the piston in a direction to oppose the pressure in the reference cell, and means including a valved passage for opening the cell and chamber and for supplying reference liquid to the cell and chamber when the piston has been retracted to effect a desired pre-loading of the spring.

5. A temperature compensating reference cell for use in determining the concentration of a solution under test by reference to its conductivity, said reference cell comprising a closed, impervious casing adapted to be kept completely full of a reference liquid as electrolyte, and a pair of electrodes within the casing, and means for stably maintaining a false pressure in the reference cell substantially above the vapor pressure of the reference liquid at the testing temperature to prevent the formation of bubbles as a result of thermal action, the means for maintaining a false pressure including an expansion chamber in communication with the reference cell which is provided with a movable wall, and spring means for applying a substantially fixed loading pressure to said wall.

6. A temperature compensating reference cell as set forth in claim 5, which further includes external means for relieving the loading pressure on said wall when it is necessary to open the cell for servicing purposes.

References Cited in the file of this patent

UNITED STATES PATENTS

| | | |
|---|---|---|
| 1,912,188 | Gann | May 30, 1933 |
| 2,470,153 | Feller | May 17, 1947 |
| 2,566,676 | Rabbitts | Sept. 4, 1951 |
| 2,581,979 | Standing et al. | Jan. 8, 1952 |
| 2,595,042 | Wyllie | Apr. 29, 1952 |

FOREIGN PATENTS

| | | |
|---|---|---|
| 333,727 | Great Britain | Aug. 21, 1930 |